United States Patent [19]
Meagher

[11] Patent Number: 5,733,056
[45] Date of Patent: Mar. 31, 1998

[54] PORTABLE KEYBOARD

[76] Inventor: Edward C. Meagher, 19 Gloria La., Huntington, N.Y. 11743

[21] Appl. No.: 761,069

[22] Filed: Dec. 5, 1996

[51] Int. Cl.$^6$ .................................................. B41J 5/10
[52] U.S. Cl. ..................................... 400/472; 400/489
[58] Field of Search ........................... 400/472, 489; 361/680; 341/22; 345/168

[56] References Cited

U.S. PATENT DOCUMENTS

| | | | |
|---|---|---|---|
| 5,137,384 | 8/1992 | Spencer et al. | 400/489 |
| 5,341,154 | 8/1994 | Bird | 345/168 |
| 5,428,355 | 6/1995 | Jondrow et al. | 361/680 |
| 5,457,453 | 10/1995 | Chiu et al. | 361/680 |
| 5,502,460 | 3/1996 | Bowen | 345/168 |

*Primary Examiner*—Edgar S. Burr
*Assistant Examiner*—Daniel J. Colilla
*Attorney, Agent, or Firm*—Edward C. Meagher, Esq.; Galgano & Burke

[57] ABSTRACT

The present invention relates to a two-piece keyboard wherein each piece mutually cooperates and reversibly engages with the other piece to rotate between a first configuration used for standard typing and a second configuration wherein the keyboard is portable. A guide mechanism and/or a spring loading mechanism can be employed to easily facilitate movement between the configurations and a locking mechanism can selectively lock the keyboard in either the first or second positions.

24 Claims, 5 Drawing Sheets

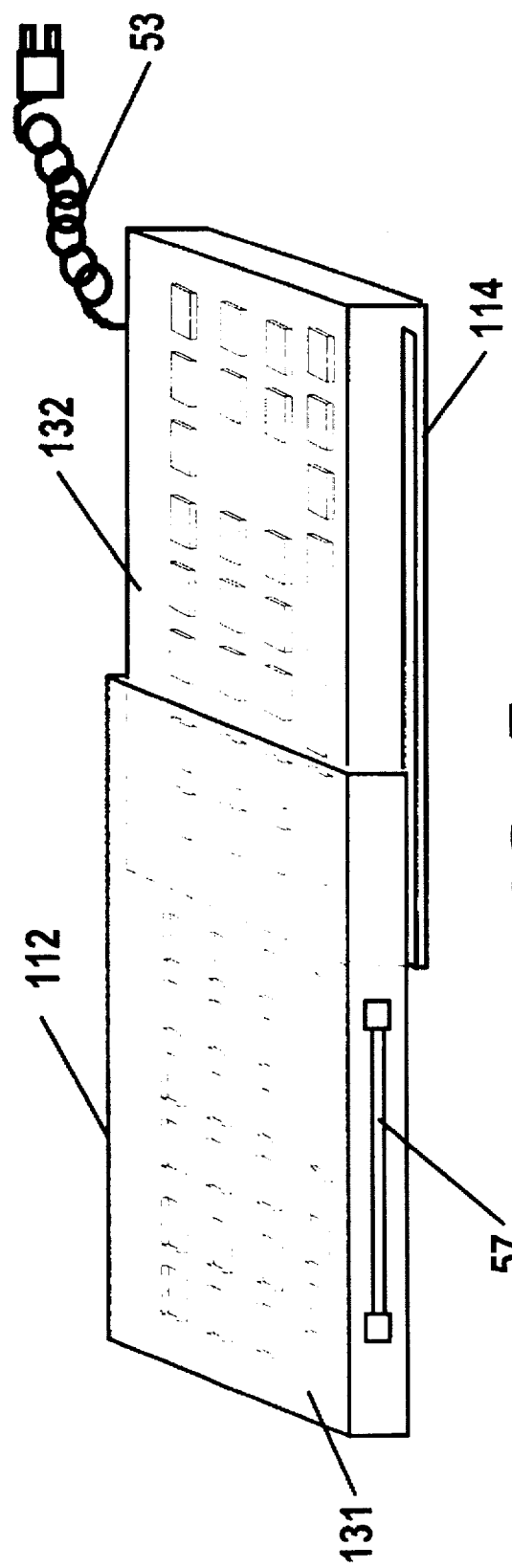

PORTABLE KEYBOARD

BACKGROUND OF THE INVENTION

1. Field of the Invention

The present invention relates to keyboards. More particularly, the present invention relates to a two-piece keyboard having mutually cooperating components which reversibly engage with one another to alternate between an open first typing configuration and a portable or size-reduced configuration.

2. Description of the Prior Art

Numerous inventions for portable keyboards have been provided for in the past. For example, some inventions known in the art involve compact versions of standard keyboards wherein the size or placement of the particular keys on the keyboard are optimized for space saving purposes, e.g. reduction in the size or number of keys. Still other keyboards known in the art such as the keyboard on the IBM THINKPAD are multi-pieced and expand from a compressed-like position to a standard typing position once the computer is opened.

By and large, the prior art keyboards are overly-complicated in design, cumbersome, expensive and difficult to manufacture.

SUMMARY OF THE INVENTION

While apparently generally acceptable for their intended functions, so far as is known, none of the prior art devices afford a keyboard which comprises a first portion and a second portion, wherein each of the portions comprises a top side, a bottom side and a plurality of keys located thereon. The two portions mutually cooperate between an open typing configuration and a portable configuration. Whereas when the keyboard is oriented in the open configuration, the top sides, the bottom sides and the typing keys of each of the portions are aligned for typing purposes. When the keyboard is disengaged from the open configuration, the first portion is rotated relative to the second portion and the second portion receivably engages the first portion so that the top side of the first portion and the top side of the second portion oppose or face one another and each bottom side of each portion acts as an outer protective cover for the keyboard.

Accordingly, it is an object of the present invention to provide a keyboard which is portable and easy to manipulate between a typing configuration and a portable configuration.

It is another object of the present invention to provide a keyboard which is economical to manufacture, durable, and relatively of simple construction and design.

Still another object of the present invention to provide a keyboard which can be manipulated in such a fashion so as to protect the typing keys from undue wear and tear during storage, transport and or prolonged periods of non-use.

Yet still, it is another object of the present invention to provide a keyboard which can be locked in either an open typing configuration or a closed transport or storage configuration.

Yet still another object of the present invention is to provide a keyboard which is collapsible and/or reducible to a convenient size for easy transport and storage.

Moreover, it is another object of the present invention to provide a keyboard which can optionally contain personalized indicia or information for security purposes.

Certain of the foregoing and related objects are attained in accordance with the present invention by the provision of a keyboard having a first portion and a second portion wherein each of the portions comprises a plurality of keys located thereon. The first portion and the second portion mutually cooperate between a first position and a second position wherein when the keyboard is configured in the first position the keys of each portion are aligned for typing. When the keyboard is configured in the second position at least one section of the first portion is selectively receivable or telescopically receivable within the second portion.

Preferably, the keyboard comprises at least one means for locking the keyboard in either the open typing position or the closed transportable position. Most desirably, the keyboard comprises at least one protective cover for protecting the typing keys of the keyboard when the same is engaged in the portable configuration.

Advantageously, the keyboard is provided with a channel or conduit located therein for selectively storing a cord for attachment to a computer. Preferably, the keyboard further comprises a handle or other convenient carrying device to aid in transport of the keyboard.

Most desirably, the keyboard comprises a guiding member for facilitating movement of the keyboard from the open configuration to the portable configuration. In one particular preferred embodiment of the present invention, the keyboard comprises a spring-loading mechanism for further facilitating movement between the two configurations.

Preferably, one of the portions is telescopically received within the other portion. Advantageously, the two portions reversibly engage one another to form a protective housing for the typing keys, i.e., the typing keys for each of the portions oppose one another in close proximity within the housing and are sufficiently protected from undue harm during transport because the bottom sides of each respective portion form an outer protective shell for protecting the internally housed typing keys.

BRIEF DESCRIPTION OF THE DRAWINGS

Other objects and features of the present invention will become apparent from the following detailed description considered in connection with the accompanied drawings which disclose several embodiments of the present invention. It should be understood, however, that the drawings are designed for the purpose of illustration only and not as a definition of the limits of the invention.

In the drawings, wherein similar reference characters denote similar elements throughout the several views:

FIG. 5e is a perspective view of the embodiment of FIGS. 5a–5d during transformation from open typing position to portable configuration.

DETAILED DESCRIPTION OF THE PREFERRED EMBODIMENT

Figure 1:
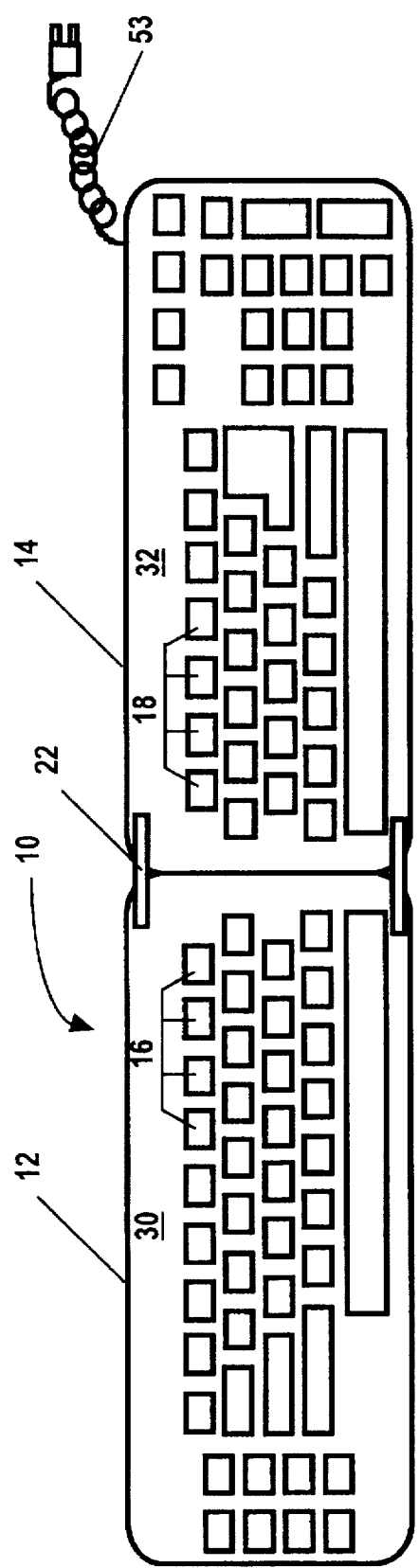
FIG. 1 is a top view of one embodiment of the present invention.

Turning now in detail to the appended drawings, and in particular FIG. 1, therein illustrated is a novel portable keyboard embodying the present invention generally designated by reference numeral 10. Keyboard 10, comprises first portion 12 and second portion 14. Each portion 12, 14 comprises top side 30, 32 and bottom side 31, 33, respectively, and a plurality of typing keys 16, 18 located thereon which are preferably arranged in a standard or typical keyboard layout. One or both of the portions 12, 14 preferably comprise locking members 22 for securing the keyboard 10 in an open, usable position for typing. Preferably, the locking members 22 are located on one of the portions 12 or 14 and are slideably engageable with the opposite portion 14 or 12 preferably in a releasably locking manner.

In the particular embodiment shown in FIG. 1, locking bar 22 is located on top Side 32 of second portion 14 and, when engaged, locking bar 22 traverses second portion 14 to engage top side 30 of first portion 12. Preferably, more than one locking bar is used to fix each portion 12, 14 in place for typing. In some cases it may be preferably to employ a locking bar 22 on each portion 12, 14 which is mutually engageable with the opposite portion 14, 12. Also shown in the embodiment of FIG. 1, one of the top sides 31 or 32 also comprises a receiving channel 23 which preferably houses the locking bar 22 when keyboard 10 is engaged in portable configuration. Preferably, the keyboard further comprises a handle 57 or other convenient carrying device to aid in transport of the keyboard.

Figure 2:
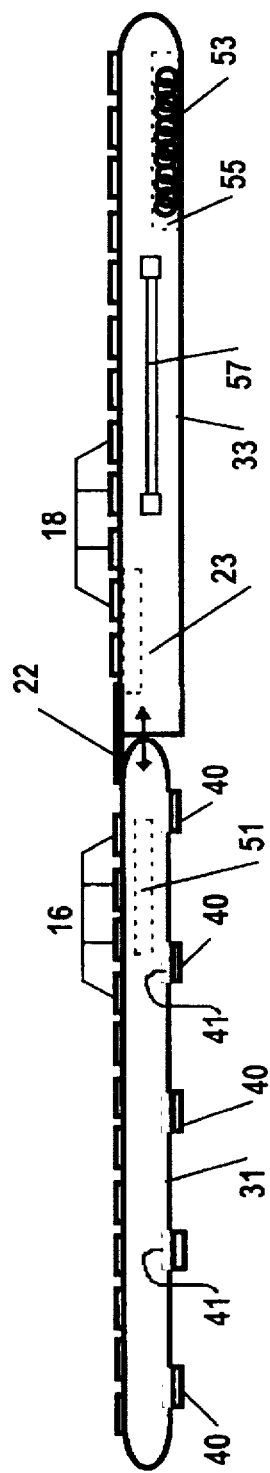
FIG. 2 is a side view of one embodiment of the present invention.

As seen best in FIG. 2, the respective portions 12, 14 of keyboard 10 are dimensioned to telescopically receive one another for easy storage and transport. Preferably, one of the portions 12, 14 comprise a leveling mechanism since one of the portions 12, 14 is dimensioned smaller than the other of the portions 12, 14 so as to facilitate telescopic movement. Preferably, the leveling mechanism comprises at least one protractible and retractable leveling pad 40 which is received within a channel 41 of the smaller of portions 12, 14. In the particular embodiment of FIG. 2, a plurality of pads 40 are received within an equal plurality of channels 41. When keyboard 10 is configured in an open or usable position, pads 40 are protracted or oriented so that they extend a certain distance from portion 12 to the point that keys 16 are level with keys 18 for typing purposes. Preferably, pads 40 are selectively retractable within channels 41 thereby reducing the overall size of portion 12 for facilitating telescopic movement between the two portions 12, 14.

Figure 3:
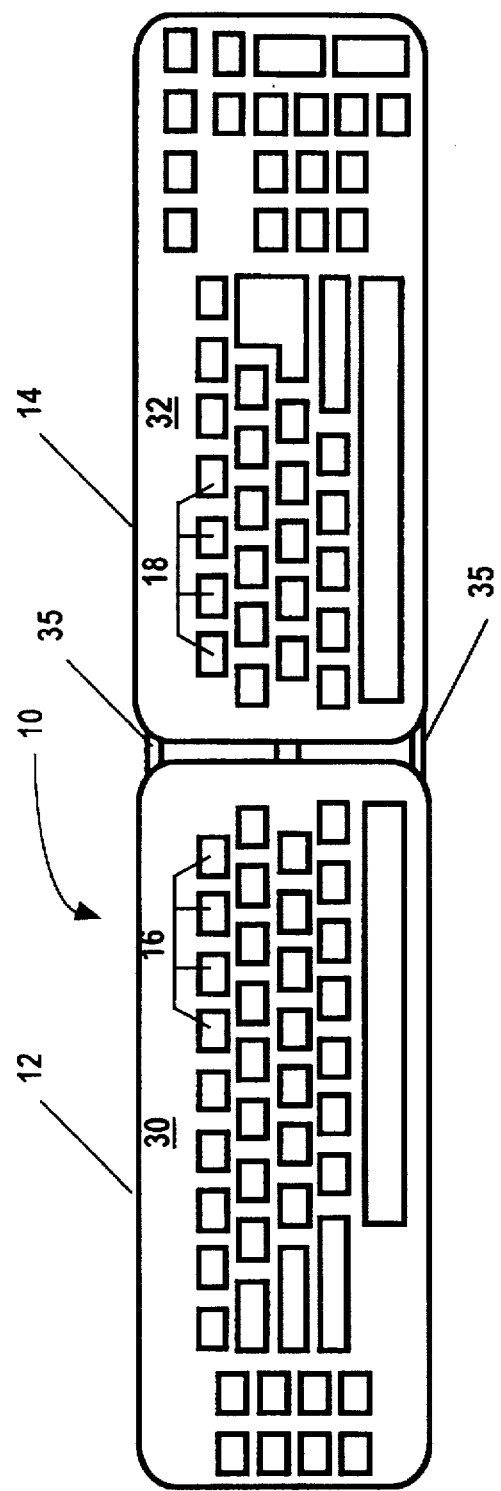
FIG. 3 is a top view of another embodiment of the present invention.
Figure 4:
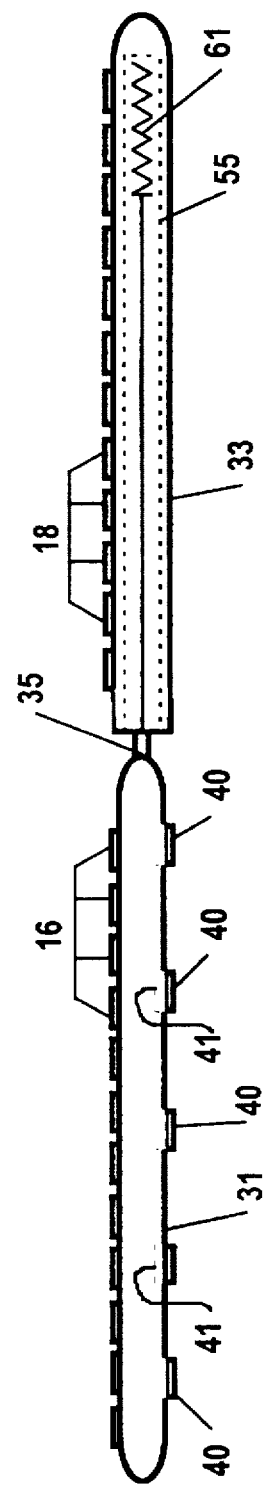
FIG. 4 is a side view of the embodiment shown in FIG. 3.

In the particular embodiment of FIGS. 3 and 4, at least one guide bar 35 is positioned between portions 12 and 14 to facilitate and control the telescopic movement of the two portions 12, 14. Advantageously, guide bar 35 comprises a locking mechanism (not shown) such as a detent, screw or pin so that the keyboard 10 can be secured in an open position for typing. In some cases it may be desirable to provide close frictional engagement between the guide bar and the portions 12, 14 so that keyboard 10 will remain in a secured open position without a locking mechanism. In another case, it may be desirable to have a guide channel (not shown) located in one of the sides of one or both of the portions 12, 14.

As depicted in FIGS. 3 and 4, a plurality of guide bars 35 are used to facilitate telescopic movement between the two portions 12, 14. Preferably, guide bars 35 are positioned at a point between top side 30, 32 and bottom side 31, 33, of each of the portions 12, 14, respectively. However, in some case it may be desirable to provide guide bar 35 or guide channel (not shown) on top side 30, 32 or bottom side 31, 33 of portions 12, 14.

Figure 5A:
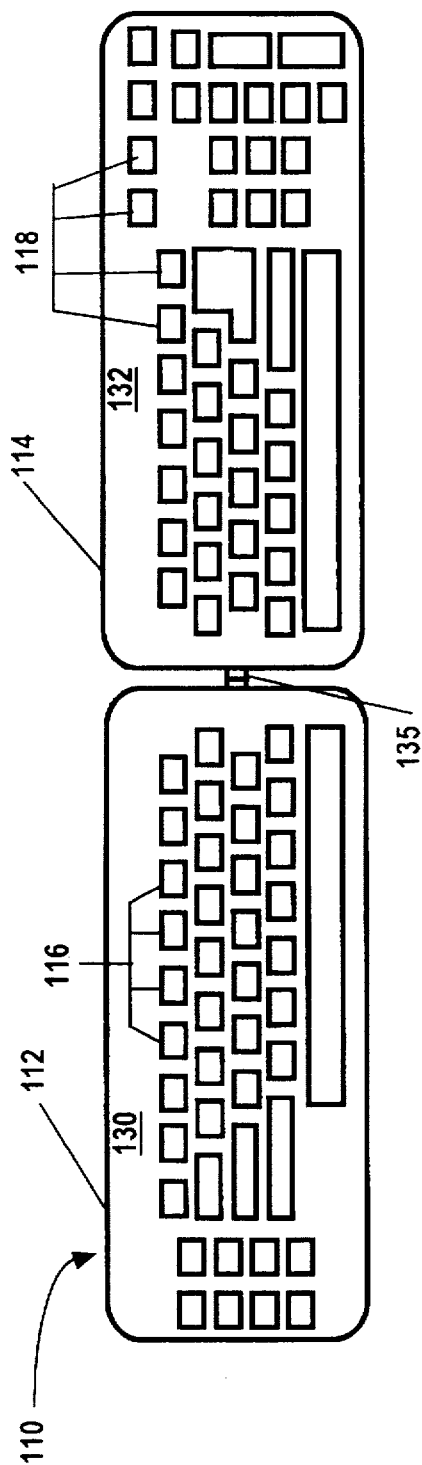
FIG. 5a is a top view of another embodiment of the present invention shown in an open typing position.
Figure 5B:
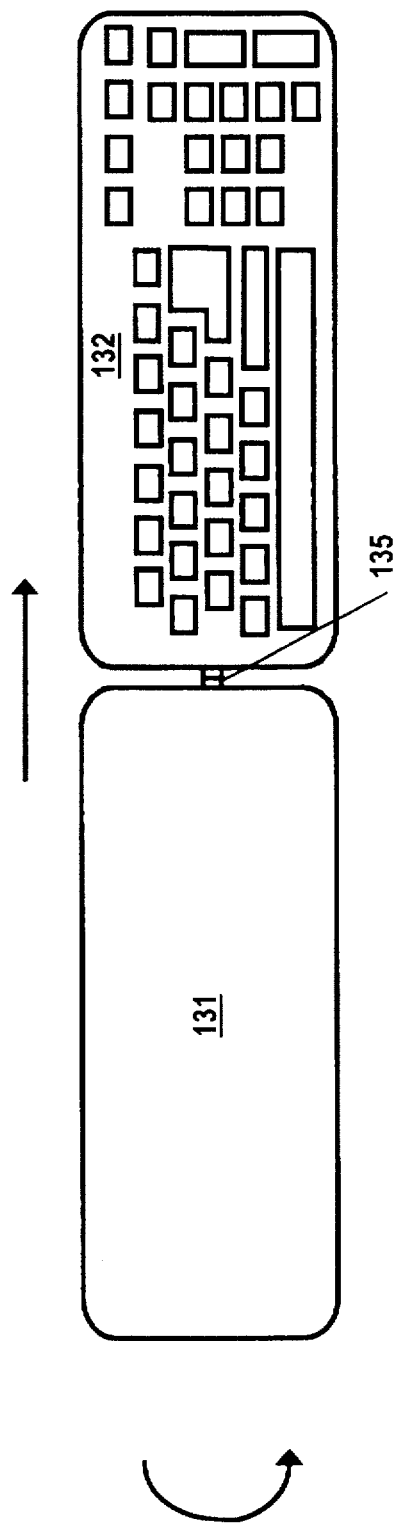
FIG. 5b is a top view of the embodiment shown in FIG. 5a with one of the portions rotated relative to the other portion.
Figure 5C:
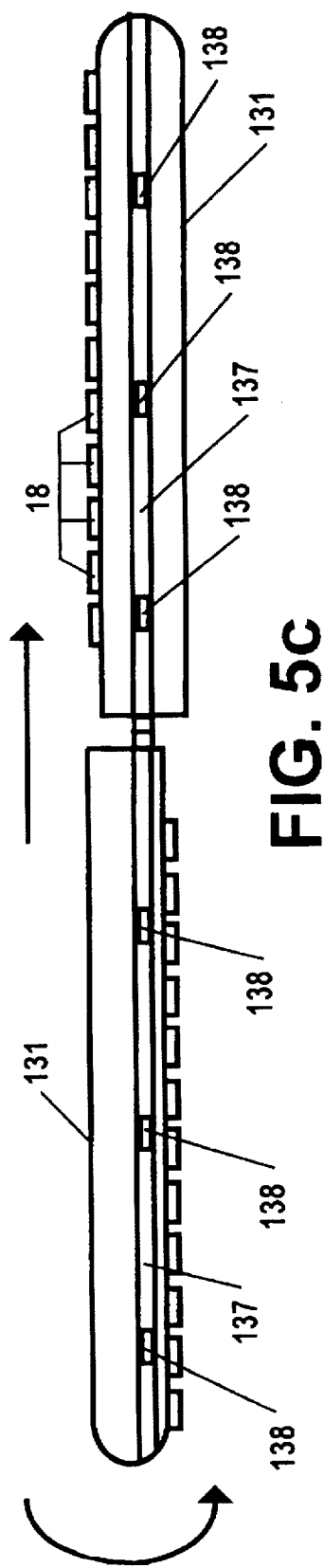
FIG. 5c is a side view of the embodiment shown in FIG. 5b.
Figure 5D:
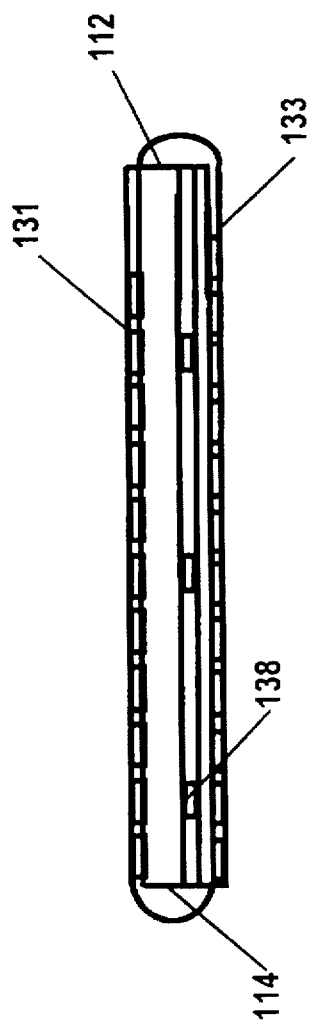
FIG. 5d is a side view of the embodiment of in FIG. 5a shown in portable configuration.

In the embodiment of the present invention shown in FIGS. 5a through 5e, keyboard 110 comprises first portion 112 and second portion 114, each portion 112, 114 comprises top side 130, 132 and bottom side 131, 133, respectively, and a plurality of typing keys 116, 118 located thereon preferably arranged in a standard layout. Preferably, a rotatable guide bar 135 is used for controlling and facilitating telescopic movement of the two portions 112, 114 and for securing keyboard 110 in an open, usable position for typing. In this particular embodiment, portion 112 can be rotated 180° about rotatable guide bar 135 so that bottom side 131 of portion 112 is parallel with top side 132 of portion 114 as seen best in FIGS. 5b and 5c. As disclosed herein, rotation of a first portion with respect to a second portion is defined as rotation of the first portion without substantial movement of the same towards or away from the second portion. As can be appreciated, with the rotational movement described in the prior art, one portion moves closer to or further from the other portion during the rotational movement in particular, rotation of the present invention is defined by rotation about an axis which passes through both first and second portions. Preferably (as depicted in FIG. 5c), both of the portions 112, 114 of this particular embodiment are substantially equal in size and dimension so that each may mutually telescopically engage a part of the other.

As can be appreciated from the present disclosure, each respective portion 112, 114 is constructed so as to be able receive the top side 130, 132 of the other of the portions 112, 114 thereby mutually protectably housing keys 116, 118 when in portable configuration. Preferably, this is accomplished by having each of the portions 112, 114 constructed in such a manner so that an inner section of each portion 112, 114 is hollow so as to receive and housably protect the keys 116, 118 of the opposite of each portion 114, 112 in the manner depicted in FIG. 5d. Advantageously, each portion is rotateably mounted with the guide bar 135 and each portion 112, 114 has at least one guide channel 136, 137 located within each of said portions 112, 114. The guide channels 136, 137 facilitate movement of each portion 112, 114 from an open usable configuration to a portable configuration. Guide bearings 138 can also be used to further facilitate telescopic movement.

As can also be appreciated from the present disclosure, in this embodiment both sets of keys 116, 118 are mutually protected when in portable configuration which will undoubtedly prolong the life of the keyboard 110 as well as protect the keys 116, 118 from accidental damage.

Various modifications may be made as will be apparent to those skilled in the art. For example, while keyboard 10 is preferably made from metal or aluminum, it may be made from a hardened yet semi-resilient plastic or rubber material adding to its flexibility and/or desirability. Keyboard 10 may be equipped with a variety of differently shaped pads 40 and locking members 22 which can be made from a variety of different materials such as plastic, rubber, aluminum or the like. Moreover, in the embodiments shown in the various figures, guide bar 35' or 135 allows rotatable movement of the two portions with respect to one another and facilitates telescopic engagement of the same, however, in some cases it may be desirable to eliminate the guide bar 35 or 135 completely and have the user control the telescopic movement of the two portions. Yet in another embodiment, guide bar 35 or 135 can also be equipped with a spring mechanism 61 for further facilitating movement between the two portions.

Although preferably pads 40 are extended and retracted in a push-button-like or similar manner, pads 40 can be engaged and retracted in a variety of different ways, e.g., pads 40 can be screwably adjustable or the pads 40 can be flipped into position. Even though the various figures show locking bar 22 and receiving channel 23 disposed along the top side 30, 32 of the respective portions 12, 14, in some cases it may be preferable to have the locking members 22 and receiving channels 23 located on the bottom sides 31, 33 of the portions 12, 14 or perhaps along the sides of each respective portion 12, 14.

In another embodiment of the present invention, it may be desirable to have a second locking mechanism for securing the keyboard 10 when in portable configuration. Or, perhaps have a mutual locking member which secures the keyboard when disposed in either configuration. In some cases it may also be desirable to construct the keyboard so that one or both of the portions 12, 14 has a place for storing the cord 53 for the keyboard such as a receiving channel 55 located on one of the sides of portions 12, 14.

In another case it may be desirable to provide a memory device 51 such as a computer or microprocessor for storing personal indicia within the keyboard 10 which will enable the keyboard 10 to interact with a host computer and may, in some cases, be used as a secondary security mechanism for owners of the keyboard. For example, a person's name, address, telephone number, etc., could easily be stored in the computer's memory of the keyboard 10. In addition, personalized macros could be stored in the computer memory as well which, as can be appreciated from the present disclosure, would enable a user to log onto any computer and have their own personal information, programs and macros readily available for use. This is especially advantageous and cost effective for larger offices since many different people could utilize the same computer at different time intervals without reprogramming the computers for personal preferences.

Keyboard 10 could be equipped with a password control mechanism which would permit only the owner to use the keyboard. Or, perhaps, the keyboard could be equipped with other computer features which would monitor the time, location and accessibility of certain files by the user. Moreover, a keyboard (rather than a computer) could be given to an employee and equipped so as to only be able to interact with certain files and deny access to other restricted files from any location within the office environment. As can be appreciated from the present disclosure, this would provide additional security and monitoring measures for an employer with or without the employee knowing that the these measures were in place.

Accordingly, while several embodiments of the present invention have been illustrated in the appended drawings, it is to be understood that various modifications may be made as will be apparent to those skilled in the art.

What is claimed is:

1. A keyboard, comprising:
   a first portion and a second portion, each of said portions comprising a plurality of keys located thereon;
   means for mounting said first portion and said second portion for rotation about an axis which passed through both of said first and second portions between a first position and at least one second position;
   whereas when said keyboard is disposed in said first position said keys of said first portion and said keys of said second portion are aligned for typing; and
   whereas when said keyboard is disposed in said second position at least one of said portions is selectively receivable within the other of said portions.

2. The keyboard according to claim 1, further comprising means for locking said keyboard in said first position.

3. The keyboard according to claim 1, further comprising means for locking said keyboard in said first position and said second position.

4. The keyboard according to claim 1 wherein at least one of said portions further comprises a top side and a bottom side and wherein one of said sides acts as a protective cover for protecting said keys when said keyboard is engaged in said second position.

5. The keyboard according to claim 1, wherein said keyboard further comprises an electrical cord and one of said portions comprises a storage channel for housing said cord.

6. The keyboard according to claim 1, wherein said keyboard further comprises means for guiding said keyboard from said first position to said second position.

7. The keyboard according to claim 1, wherein said keyboard further comprises a spring means for assisting and facilitating movement between said first position and said second position.

8. The keyboard according to claim 1, wherein one of said portions is telescopically receivable within the other of said portions.

9. A keyboard, comprising:
   a first portion and a second portion, each of said portions comprising a plurality of keys located on a first side and a protective cover located on a second side;
   means for mounting said first portion and said second portion for rotation about an axis which passes through both of said first and second portions between a first position and at least one second position;
   whereas when said keyboard is oriented in said first position said keys of said first portion and said keys of said second portion are aligned for typing and said protective covers of said first portion and said second portion are also aligned; and
   whereas when said first and second portions are rotated to said at least one second position said first portion selectively engages said second portion such that said protective cover of said first portion harbors and protects said keys of said second portion and said protective cover of said second portion harbors and protects said keys of said first portion.

10. The keyboard according to claim 9, further comprising means for locking said keyboard in said first position.

11. The keyboard according to claim 9, further comprising means for locking said keyboard in said first position and said second position.

12. The keyboard according to claim 9, wherein said keyboard further comprises a cord and one of said portions comprises a storage channel for housing said cord.

13. The keyboard according to claim 9, wherein said keyboard further comprises means for guiding said keyboard from said first position to said second position.

14. The keyboard according to claim 9, wherein said keyboard further comprises a spring means for assisting and facilitating movement between said first position and said second position.

15. The keyboard according to claim 9, wherein said keyboard further comprises means for storing personal indicia therein.

16. The keyboard according to claim 15, wherein said storing means are electronic.

17. The keyboard according to claim 9, wherein said keyboard additionally comprises a password control mechanism.

18. The keyboard according to claim 17, wherein said password control includes a computer program.

19. The keyboard according to claim 9, wherein said keyboard further comprises a handle disposed thereon.

20. The keyboard according to claim 1, wherein said keyboard additionally comprises means for leveling said first portion with respect to said second portion.

21. The keyboard according to claim 20, wherein said leveling means comprises a selectively protrudeable leveling mechanism disposed on at least one of said portions.

22. The keyboard according to claim 9, further comprising means for monitoring the time, location and access to files of the keyboard user.

23. The keyboard according to claim 22 wherein said monitoring means comprises a computer program.

24. A keyboard, comprising:

a first portion and a second portion, each of said portions comprising a top side and a bottom side and each of said portions comprising a plurality of typing keys located on one of said sides;

means for mounting said first portion and said second portion for rotation about an axis which passes through both of said first and second portions between a first position and at least one second position;

whereas when said keyboard is oriented in said first position said top sides, said bottom sides and said keys of each of said portions are aligned for typing; and whereas when said first portion is rotated relative to said second portion, first position and said first portion is rotated with respect to said second portion receivably engages said first portion such that said top side of said first portion and said bottom side of said second portion are proximate to one another and each of said bottom sides of each of said portions act as an outer protective cover for said keyboard.

* * * * *

UNITED STATES PATENT AND TRADEMARK OFFICE
CERTIFICATE OF CORRECTION

PATENT NO. : 5,733,056

DATED : March 31, 1998

INVENTOR(S) : Meagher

It is certified that error appears in the above-identified patent and that said Letters Patent is hereby corrected as shown below:

Colum 4, line 62, change " 35' " to -- 35 --.

IN THE CLAIMS:
Claim 1, line 5, change " passed " to -- passes --; and
Claim 24, line 14, after " second portion, " delete " first position and said first portion is rotated with respect to ".

Signed and Sealed this

Fourth Day of August, 1998

Attest:

BRUCE LEHMAN

Attesting Officer

Commissioner of Patents and Trademarks